US012664442B2

(12) United States Patent
Anderson et al.

(10) Patent No.: US 12,664,442 B2
(45) Date of Patent: Jun. 23, 2026

(54) COMPUTER-BASED TECHNIQUES FOR CAPTURING KNOWLEDGE ABOUT COMPUTER-BASED TASKS

(71) Applicant: AUTODESK, INC., San Francisco, CA (US)

(72) Inventors: Fraser Anderson, Camrose (CA); George Fitzmaurice, Toronto (CA); Tovi Grossman, Toronto (CA); Rebecca Paige Krosnick, Ann Arbor, MI (US); Walter Lasecki, Ann Arbor, MI (US); Justin Frank Matejka, Newmarket (CA); Steve Oney, Ann Arbor, MI (US)

(73) Assignee: AUTODESK, INC., San Francisco, CA (US)

( * ) Notice: Subject to any disclaimer, the term of this patent is extended or adjusted under 35 U.S.C. 154(b) by 1235 days.

(21) Appl. No.: 17/211,691

(22) Filed: Mar. 24, 2021

(65) Prior Publication Data

US 2021/0304019 A1      Sep. 30, 2021

Related U.S. Application Data

(60) Provisional application No. 63/000,680, filed on Mar. 27, 2020.

(51) Int. Cl.
*G10L 15/22*      (2006.01)
*G06F 3/16*       (2006.01)
(Continued)

(52) U.S. Cl.
CPC .............. *G06N 5/02* (2013.01); *G06F 3/167* (2013.01); *G06F 9/451* (2018.02);
(Continued)

(58) Field of Classification Search
USPC ................................................ 704/7–10, 257
See application file for complete search history.

(56) References Cited

U.S. PATENT DOCUMENTS 6,370,238 B1 * 4/2002 Sansone ................ H04M 3/493
                                                              379/88.16
9,560,206 B2 * 1/2017 Jones ...................... H04M 3/56
                      (Continued)

OTHER PUBLICATIONS

Carroll et al., "Raison d'Etre: Capturing Design History and Rationale In Multimedia Narratives", Proceedings of the CHI'94 Conference on Human Factors in Computing Systems, Publ by ACM, Apr. 24-28, 1994, pp. 192-197.
(Continued)

*Primary Examiner* — Leonard Saint-Cyr
(74) *Attorney, Agent, or Firm* — Artegis Law Group, LLP

(57) ABSTRACT

In various embodiments, a knowledge capture application automatically captures knowledge associated with computer-based tasks. While a computer-based task is performed during a computer-based session, the knowledge capture application performs operation(s) on a user utterance to automatically generate a knowledge item. The knowledge capture application performs classification operation(s) on the knowledge item to generate a categorized knowledge item that associates the knowledge item with a first category. Subsequently, the knowledge capture application modifies a first element included in a graphical user interface to visually indicate an actual capture level associated with the first category. The knowledge capture application generates a knowledge dataset based on the first categorized knowledge item for storage or display. Advantageously, automatically generating the knowledge items and visually prompting the user via the actual capture levels during the computer-based session can increase both the comprehensiveness and the quality of the knowledge dataset.

19 Claims, 5 Drawing Sheets

(51) Int. Cl.

| | |
|---|---|
| *G06F 9/451* | (2018.01) |
| *G06N 5/02* | (2023.01) |
| *G10L 15/18* | (2013.01) |
| *G10L 25/63* | (2013.01) |
| *G10L 15/08* | (2006.01) |

(52) U.S. Cl.

CPC .......... *G10L 15/1815* (2013.01); *G10L 15/22* (2013.01); *G10L 25/63* (2013.01); *G10L 2015/088* (2013.01)

(56) References Cited

U.S. PATENT DOCUMENTS

| | | | | |
|---|---|---|---|---|
| 11,790,892 B1 * | 10/2023 | Kessler | ................ | G06N 3/0475 704/232 |
| 2014/0051399 A1 * | 2/2014 | Walker | .................... | G10L 15/08 455/412.1 |
| 2015/0195406 A1 * | 7/2015 | Dwyer | .................... | G10L 25/72 379/265.07 |

OTHER PUBLICATIONS

Chandrasegaran et al., "TalkTraces: Real-Time Capture and Visualization of Verbal Content in Meetings", Proceedings of the 2019 CHI Conference on Human Factors in Computing Systems, ACM, https://doi.org/10.1145/3290605.3300807, Paper 577, May 4-9, 2019, pp. 1-14.

Chi et al., "MixT: Automatic Generation of Step-by-Step Mixed Media Tutorials", Proceedings of the 25th annual ACM Symposium on User Interface Software and Technology, ACM, Oct. 7-10, 2012, pp. 93-102.

D'Mello et al., "AutoTutor Detects and Responds to Learners Affective and Cognitive States", Workshop on Emotional And Cognitive Issues at The International Conference on Intelligent Tutoring Systems, 2008, 13 pages.

Dragunov et al., "TaskTracer: a Desktop Environment to Support Multi-tasking Knowledge Workers", Proceedings of the 10th International Conference on Intelligent User Interfaces, ACM, Jan. 9-12, 2005, pp. 75-82.

Grossman et al., "Chronicle: Capture, Exploration, and Playback of Document Workflow Histories", Proceedings of the 23nd Annual ACM Symposium on User Interface Software and Technology, ACM, Oct. 3-6, 2010, pp. 143-152.

Hertzum et al., "Scrutinising usability evaluation: does thinking aloud affect behaviour and mental workload?", Behaviour & Information Technology, vol. 28, No. 2, DOI: 10.1080/01449290701773842, Mar.-Apr. 2009, pp. 165-181.

Kuusela et al., "A comparison of concurrent and retrospective verbal protocol analysis", The American Journal of Psychology, vol. 113, No. 3, 2000, pp. 387-404.

Lee et al., "Using Lifelogging to Support Recollection for People with Episodic Memory Impairment and their Caregivers", Proceedings of the 2nd International Workshop on Systems and Networking Support for Health Care and Assisted Living Environments, ACM, Jun. 17, 2008, 3 pages.

Lee et al., "Lifelogging Memory Appliance for People with Episodic Memory Impairment", Proceedings of the 10th International Conference on Ubiquitous Computing, ACM, Sep. 21-24, 2008, pp. 44-53.

Lewis, Clayton, "Using the "Thinking-aloud", Method in Cognitive Interface Design", Research Report RC9265, IBM TJ Watson Research Center, Feb. 17, 1982, pp. 1-6.

Li et al., "Personal Informatics in the Wild:Hacking Habits for Health & Happiness", CHI'13, Extended Abstracts on Human Factors in Computing Systems, ACM, Apr. 27-May 2, 2013, pp. 3179-3182.

Mark et al., "The Cost of Interrupted Work: More Speed and Stress", Proceedings of the SIGCHI conference on Human Factors in Computing Systems, ACM, Apr. 5-10, 2008, pp. 107-110.

McGregor et al., "More to Meetings: Challenges in Using Speech-Based Technology to Support Meetings", Proceedings of the 2017 ACM Conference on Computer Supported Cooperative Work and Social Computing, ACM, DOI: http://dx.doi.org/10.1145/2998181. 2998335, Feb. 25-Mar. 1, 2017, pp. 2208-2220.

Mysore et al., "Torta: Generating Mixed-Media GUI and Command-Line App Tutorials Using Operating-System-Wide Activity Tracing", Proceedings of the 30th Annual ACM Symposium on User Interface Software and Technology, ACM, https://doi.org/10.1145/3126594.3126628, Oct. 22-25, 2017, pp. 703-714.

Park et al., "Post-literate Programming: Linking Discussion and Code in Software Development Teams", The 31st Annual ACM Symposium on User Interface Software and Technology Adjunct Proceedings, DOI: https://doi.org/10.1145/3266037.3266098, ACM, Oct. 14-17, 2018, pp. 51-53.

Pousman et al., "A Taxonomy of Ambient Information Systems:Four Patterns of Design", Proceedings of the Working Conference on Advanced Visual Interfaces, ACM, May 23-26, 2006, pp. 67-74.

Radford et al., "Improving Language Understanding by Generative Pre-Training", URL https://s3-us-west-2.amazonaws.com/openai-assets/research-covers/language-unsupervised/language_understanding_paper.pdf, 2018, pp. 1-12.

Rasmussen et al., "Co-notate: Exploring Real-time Annotations to Capture Situational Design Knowledge", Proceedings of the 2019 on Designing Interactive Systems Conference, ACM, DOI: https://doi.org/10.1145/3322276.3322310, Jun. 23-28, 2019, pp. 161-172.

Rosner et al., "Spyn: Augmenting Knitting to Support Storytelling and Reflection", Proceedings of the 10th International Conference on Ubiquitous Computing, ACM, Sep. 21-24, 2008, pp. 340-349.

Sellen et al., "Beyond Total Capture:a Constructive Critique of Lifelogging", Communications of the ACM, vol. 53, No. 5, DOI: 10.1145/1735223.1735243, May 2010, pp. 70-77.

Shah et al., "Lifelogging: Archival and Retrieval of Continuously Recorded Audio Using Wearable Devices", 2012 IEEE International Conference on Emerging Signal Processing Applications, IEEE, 2012, pp. 99-102.

Thudt et al., "Visual Mementos: Reflecting Memories with Personal Data", IEEE Transactions on Visualization and Computer Graphics, vol. 22, No. 1, DOI 10.1109/TVCG.2015.2467831, 2015, pp. 369-378.

Tseng, Tiffany, "Build in Progress: Building Process-Oriented Documentation", Makeology: Makerspaces as Learning Environments, New York: Routledge, 2016. pp. 1-17.

Haak et al., "Retrospective vs. concurrent think-aloud protocols: testing the usability of an online library catalogue", Behaviour & Information Technology, vol. 22, No. 5, DOI: 10.1080/0044929031000, 2003, pp. 339-351.

Haak et al., "Exploring Two Methods of Usability Testing: Concurrent Versus Retrospective Think-Aloud Protocols", IEEE International Professional Communication Conference, IPCC, 2003, pp. 285-287.

Young et al., "Recent Trends in Deep Learning Based Natural Language Processing", IEEE Computational Intelligence Magazine, vol. 13, No. 3, DOI 10.1109/MCI.2018.2840738, Aug. 2018, pp. 55-75.

Nielsen, Jakob, "Thinking Aloud: The #1 Usability Tool", Nielsen Norman Group, Retrieved from https://www.nngroup.com/articles/thinking-aloud-the-1-usability-tool/, on Sep. 14, 2021, Jan. 15, 2012, 5 pages.

* cited by examiner

Stop Recording ■

Currently Recording

Transcription *"Because I want to give it a bit of flare, tapered edge, maybe something like 6 or 7."*

Recording Window 260

FIGURE 3A

Knowledge Review Window 192

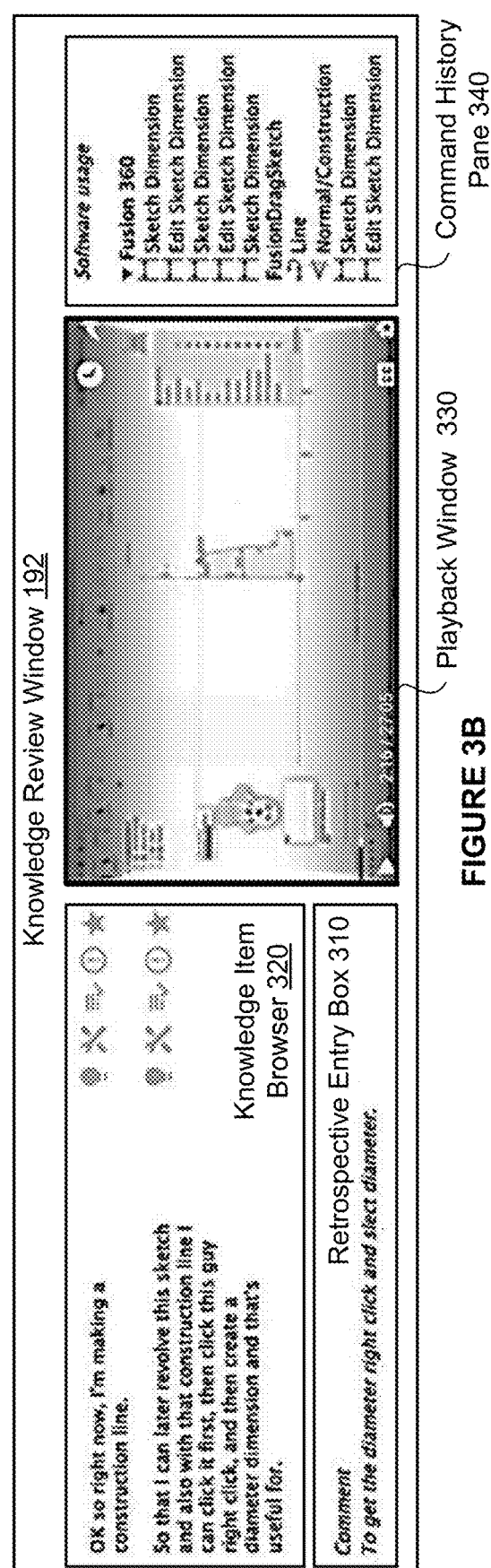

OK so right now, I'm making a construction line.

So that I can later revolve this sketch and also with that construction line I can click it first, then click this guy right click, and then create a diameter dimension and that's useful for.

Knowledge Item Browser 320

*Comment*
*To get the diameter right click and slect diameter.*

Retrospective Entry Box 310

*Software usage*

▼ Fusion 360
  [·] Sketch
  [·] Edit Sketch Dimension
  [·] Sketch Dimension
  [·] Edit Sketch Dimension
  [·] Sketch Dimension
  FusionDragSketch
  ↻ Line
▽ Normal/Construction
  [·] Sketch Dimension
  [·] Edit Sketch Dimension Command History Pane 340

Playback Window 330

FIGURE 3B

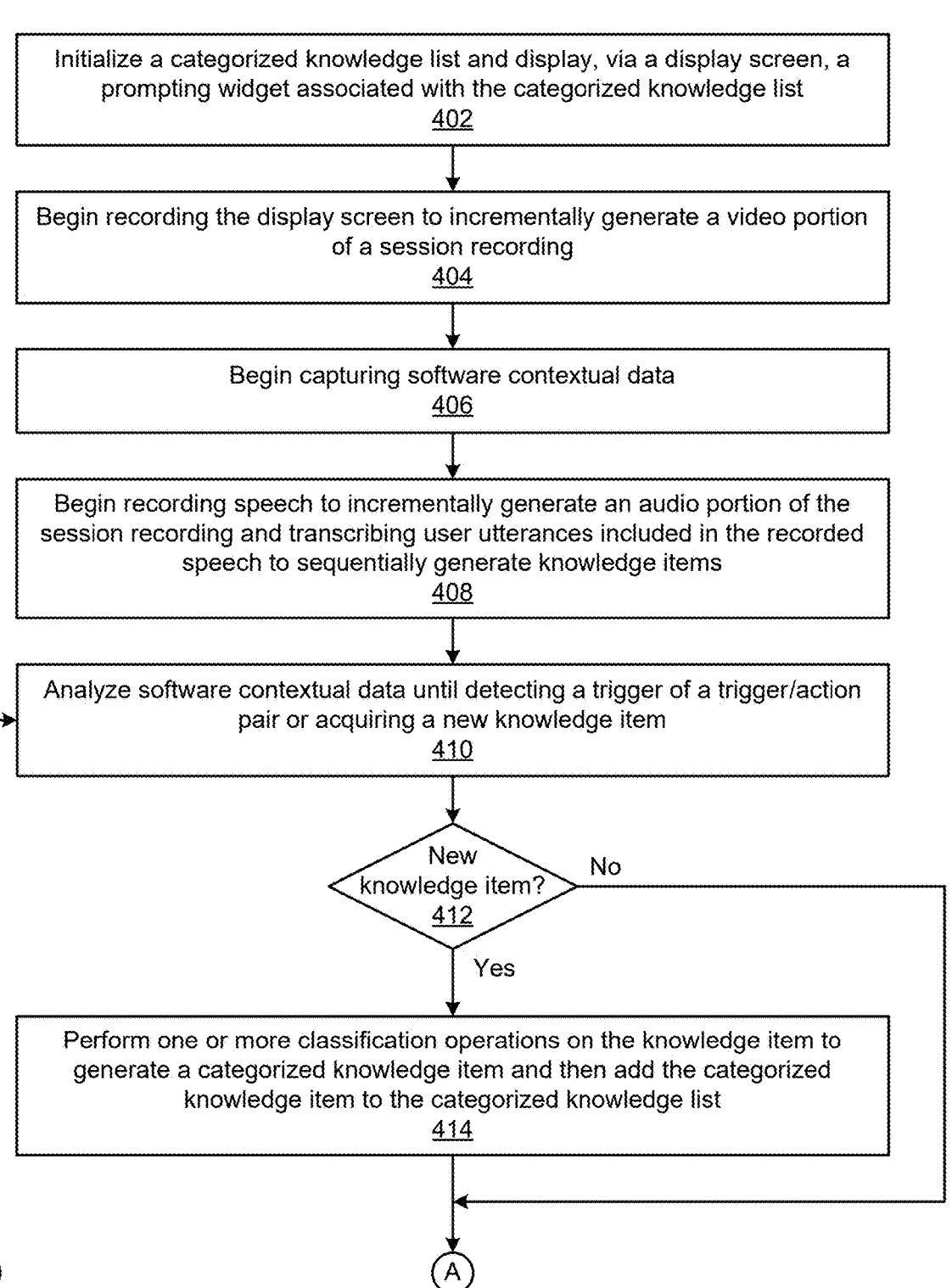

400

Initialize a categorized knowledge list and display, via a display screen, a prompting widget associated with the categorized knowledge list
402

Begin recording the display screen to incrementally generate a video portion of a session recording
404

Begin capturing software contextual data
406

Begin recording speech to incrementally generate an audio portion of the session recording and transcribing user utterances included in the recorded speech to sequentially generate knowledge items
408

Analyze software contextual data until detecting a trigger of a trigger/action pair or acquiring a new knowledge item
410

New knowledge item?
412

No

Yes

Perform one or more classification operations on the knowledge item to generate a categorized knowledge item and then add the categorized knowledge item to the categorized knowledge list
414

COMPUTER-BASED TECHNIQUES FOR CAPTURING KNOWLEDGE ABOUT COMPUTER-BASED TASKS

CROSS-REFERENCE TO RELATED APPLICATIONS

This application claims priority benefit of the United States Provisional Patent Application titled, "Techniques for Think Aloud Computing," filed on Mar. 27, 2020 and having Ser. No. 63/000,680. The subject matter of this related application is hereby incorporated herein by reference.

BACKGROUND

Field of the Various Embodiments

The various embodiments relate generally to computer science and software documentation tools and, more specifically, to computer-based techniques for capturing knowledge about computer-based tasks.

Description of the Related Art

Many industries make extensive use of software applications that offer large feature sets associated with hundreds or even thousands of commands executed via complex graphical user interfaces ("GUIs"). Users often combine personal experience using these types of feature sets with domain-specific knowledge to perform various computer-based tasks. However, the resulting outputs or "artifacts" typically contain little or no information about the procedures used to generate the artifacts. As a result, the know-how or knowledge associated with generating the artifacts can be lost. Losing knowledge has many downsides and can result, for example and without limitation, in needless replication of effort when generating similar artifacts, inefficiencies when subsequently modifying the artifacts, and misunderstandings with respect to the features and/or limitations of the artifacts. Accordingly, many organizations require knowledge for important computer-based tasks and the resulting artifacts to be captured and stored for retrospective review.

Some approaches to capturing and storing knowledge are more human-based and involve manually generating knowledge documentation using text editors. One drawback of these approaches is that manually generating documentation is time consuming, and manually identifying shortcomings in the depth and/or scope of the documented procedure knowledge can be difficult, if not impossible. Consequently, users typically do not document their knowledge in a comprehensive way, which can substantially reduce the value and usefulness of that documentation. Another drawback of these approaches is that, in practice, users often delay documenting knowledge for days, weeks, or even months after performing the associated computer-based tasks. Because recollections fade over time, the quality of the documented knowledge can be subpar.

Other approaches to capturing and storing knowledge are more machine-centric and involve automatically recording relevant data while a computer-based task is being performed and subsequently displaying a GUI through which a user can retrospectively annotate the recorded data. However, conventional software usually is not configured to automatically detect shortcomings in the depth and/or scope of knowledge captured for a given computer-based task while the computer-based task is being performed. Thus, the user is still required to go back and annotate the recorded data after completing the relevant computer task and also check the recorded data for shortcomings in depth and/or scope. Accordingly, both the comprehensiveness and the quality of the knowledge captured using conventional machine-centric approaches can be substantially diminished, which, again, reduces the value and usefulness of that knowledge.

As the foregoing illustrates, what is needed in the art are more effective techniques for capturing knowledge associated with computer-based tasks.

SUMMARY

One embodiment of the present invention sets forth a computer-implemented method for automatically capturing knowledge associated with computer-based tasks. The method includes, during a computer-based session during which a computer-based task is being performed, performing one or more operations on a first user utterance to automatically generate a first knowledge item; performing one or more classification operations on the first knowledge item to generate a first categorized knowledge item that associates the first knowledge item with a first category; modifying a first element included in a graphical user interface to visually indicate an actual capture level associated with the first category; and generating a knowledge dataset based on the first categorized knowledge item for storage or display.

At least one technical advantage of the disclosed techniques relative to the prior art is that the disclosed techniques can be incorporated into a software application to enable the software application to automatically capture and detect shortcomings in the knowledge associated with computer-based tasks, while those tasks are being performed via the software application and/or different software application(s). In particular, with the disclosed techniques, the software application can visually prompt a user to increase the depth and/or scope of a running commentary associated with a computer-based task when the actual capture levels for one or more knowledge categories are lower than corresponding target capture levels for those categories. This functionality, which is not available in conventional software applications, can increase both the comprehensiveness and the overall quality of the knowledge captured by the software application. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3A is an exemplar illustration of the recording window of FIG. 2, according to various embodiments;

FIG. 3B is an exemplar illustration of the knowledge review window of FIG. 1, according to various embodiments; and FIGS. 4A-4B set forth a flow diagram of method steps for automatically capturing the knowledge associated with a computer-based task, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
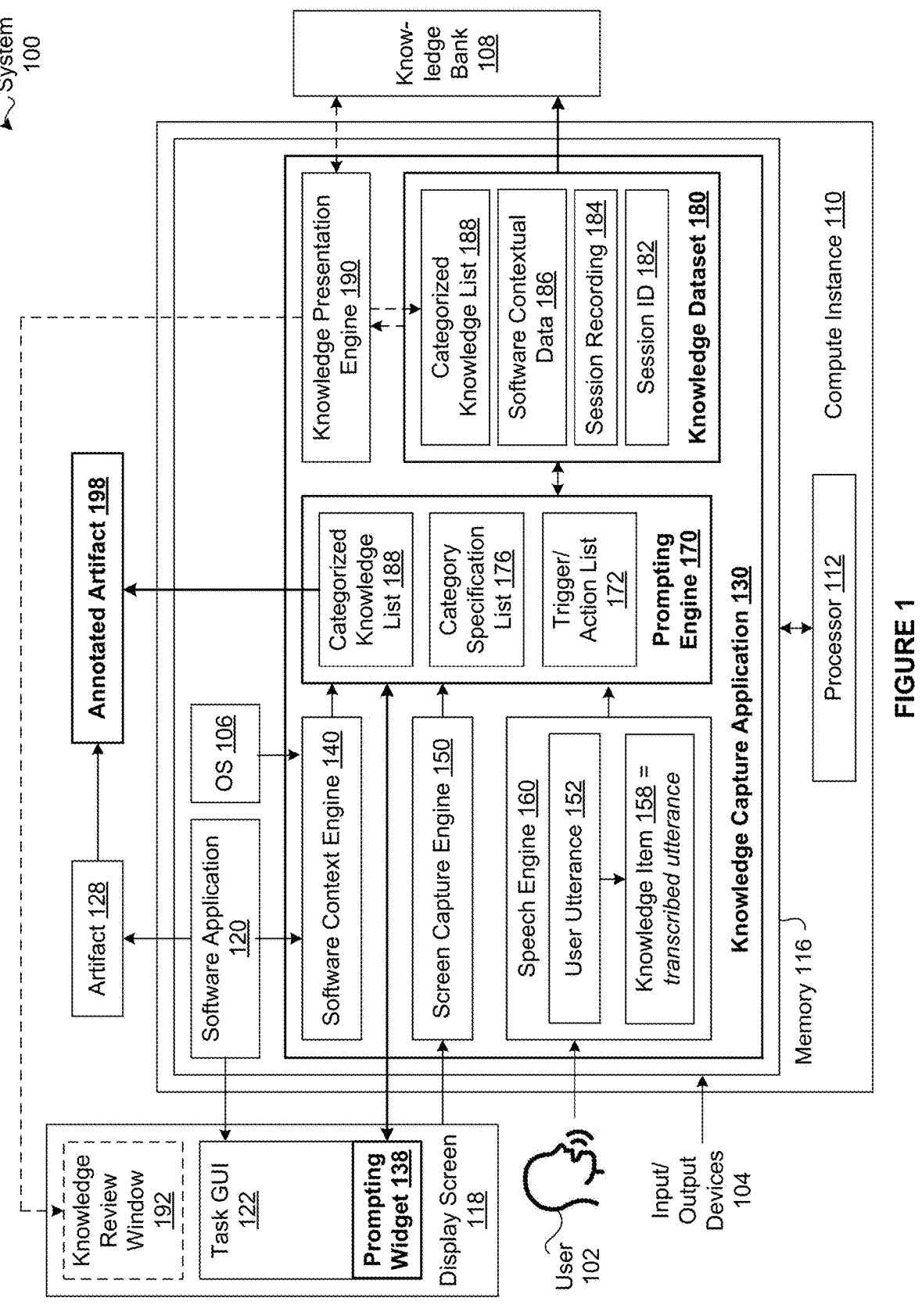
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a compute instance 110, a display screen 118, a knowledge bank 108, and an artifact 128. In some other embodiments, the system 100 can further include, without limitation, one or more other compute instances, one or more other display screens, one or more other knowledge banks, one or more other artifacts, or any combination thereof. In some embodiments, any amount and/or type of storage can replace the knowledge bank 108. In the same or other embodiments, the artifact 128 can be omitted from the system 100.

Any number of the components of the system 100 can be distributed across multiple geographic locations or implemented in one or more cloud computing environments (i.e., encapsulated shared resources, software, data, etc.) in any combination. In some embodiments, the compute instance 110 and/or one or more other compute instances can be implemented in a cloud computing environment, implemented as part of any other distributed computing environment, or implemented in a stand-alone fashion.

As shown, in some embodiments, the compute instance 110 includes, without limitation, a processor 112 and a memory 116. The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110.

In some other embodiments, the processor 112, zero or more other processors, the memory 116, and zero or more other memories can be distributed across the compute instance 110 and zero or more other compute instances in any technically feasible fashion. In particular, the compute instance 110 and zero or more other compute instances can provide a multiprocessing environment in any technically feasible fashion.

The memory 116 can be one or more of a readily available memory, such as random-access memory, read only memory, floppy disk, hard disk, or any other form of digital storage, local or remote. In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

As shown, in some embodiments, the compute instance 110 is connected to input/output ("I/O") devices 104. The I/O devices 104 can include, without limitation, one or more devices configured to receive input, one or more devices configured to provide output, one or more devices configured to both receive input and provide output, or any combination thereof. Some examples of devices that can be configured to receive input include, without limitation, a keyboard, a mouse, and a microphone. Some examples of devices that can be configured to provide output include, without limitation, a display device and a speaker. Some examples of devices that can be configured to both receive input and provide output include, without limitation, a touchscreen and a universal serial bus port.

In some embodiments, the I/O devices 104 include, without limitation, at least one device (e.g., a microphone) configured to receive audio input from a user 102. In the same or other embodiments, the I/O devices 104 include, without limitation, a display device having a display screen 118 that can be configured to display any amount and/or types of visual content in any technically feasible fashion. For instance, in some embodiments, the I/O devices 104 include, without limitation, a microphone, a display device having the display screen 118, a keyboard, and a mouse.

In some embodiments, the compute instance 110 can be integrated with any number and/or types of other devices (e.g., other compute instances, any number of the I/O devices 104, etc.) into a user device. Some examples of user devices include, without limitation, desktop computers, laptops, smartphones, smart televisions, game consoles, tablets, etc.

In general, the compute instance 110 is configured to implement one or more software applications. For explanatory purposes only, each software application is described as residing in the memory 116 of the compute instance 110 and executing on the processor 112 of the compute instance 110. In some embodiments, any number of software applications can reside in any number of other memories of any number of other compute instances and execute on any number of other processors of any number of the other compute instances in any combination. In the same or other some embodiments, the functionality described herein for any number of software applications can be distributed across any number of other software applications. Further, subsets of the functionality of multiple software applications can be consolidated into a single software application.

In particular, the compute instance 110 is configured to automatically capture and store knowledge associated with computer-based tasks. As described previously herein, in some approaches to capturing and storing knowledge involve automatically recording relevant data while a computer-based task is being performed and subsequently displaying a GUI through which a user can retrospectively annotate the recorded data. However, conventional software usually is not configured to automatically detect shortcomings in the depth and/or scope of knowledge captured for a given computer-based task while the computer-based task is being performed. Thus, the user is still required to go back and annotate the recorded data after completing the relevant computer task and also check the recorded data for shortcomings in depth and/or scope. Accordingly, both the comprehensiveness and the quality of the knowledge captured using these types of conventional approaches can be substantially diminished, which, can substantially reduce the value and usefulness of that knowledge.

Automatically Determining Knowledge from User Input

To address the above problems, in some embodiments, the compute instance 110 includes, without limitation, a knowledge capture application 130 that is configured to capture and detect deficiencies in knowledge while computer-based tasks are performed via software applications. For exemplary purposes only, the functionality of the knowledge capture application 130 is described in the context of a computer-based task performed by the user 102 via a software application 120 during a period of time referred to herein as "a current computer-based session."

As referred to herein, knowledge of a given computer-based task can include, without limitation, any amount and/or types of data that can provide insights into the computer-based task and any direct results and/or indirect results of the computer-based task. In some embodiments, knowledge of a given computer-based task can include, without limitation, any amount and/or types of procedural knowledge, any amount and/or types of declarative knowledge (e.g., semantic knowledge, episodic knowledge, etc.), or any combination thereof. For instance, in some embodiments, the knowledge can describe, without limitation, any number of goals, intentions, workflows, problems, decisions, reasons for decisions, alternatives, outstanding or "to-do" items, limitations, constraints, and features associated with the computer-based task and/or results of the computer-based task. Different portions of the knowledge can be associated with different levels of granularity (e.g., a high-level description of a workflow and lower-level steps in the workflow) and can be associated with any amount and/or types of objective characteristics and/or subjective characteristics.

As described in greater detail below, in some embodiments, the knowledge capture application 130 records, without limitation, a display screen 118, any amount and/or types of software contextual data 186 (e.g., commands), and spoken input during the current computer-based session. Throughout the current computer-based session, the knowledge capture application 130 displays a prompting widget 138 on the display screen 118. In some embodiments, the prompting widget 138 can be any type of GUI. The prompting widget 138 includes, without limitation, any number and/or types of graphical elements that are designed to encourage the user 102 to speak about the computer-based task or "think-aloud" as the user 102 performs the computer-based task.

The knowledge capture application 130 automatically and incrementally converts the speech or "commentary" into a categorized knowledge list 188. The categorized knowledge list 188 includes, without limitation, any number of categorized knowledge items (not shown). Each categorized knowledge item specifies, without limitation, a transcribed utterance, zero or more categories to which the categorized knowledge item belongs, and one or more timestamps (e.g., a start timestamp and optionally an end timestamp).

As the knowledge capture application 130 generates the categorized knowledge list 188, the knowledge capture application 130 updates the prompting widget 138 to visually indicate one or more actual capture levels with respect to one or more target capture levels. In some embodiments, each target capture level is associated with a different category of knowledge. Advantageously, the prompting widget 138 encourages the user 102 to speak more about categories of knowledge or "knowledge categories" for which the actual capture levels are lower than the target capture levels.

In some embodiments, the knowledge capture application 130 incrementally generates a knowledge dataset 180 during the current computer-based session. At any given point in time, the knowledge dataset 180 includes, without limitation, the categorized knowledge list 188 at the point in time and the recorded data at the point in time. In the same or other embodiments, after the current computer-based session is complete, the knowledge capture application 130 stores the knowledge dataset 180 in the knowledge bank 108.

In some embodiments, during the current computer-based session, the knowledge capture application 130 enables the user 102 to review and/or modify the knowledge dataset 180 and/or any number of other knowledge datasets stored in the knowledge bank 108 via a knowledge review window 192. In the same or other embodiments, after the current computer-based session is complete, the knowledge capture application 130 enables the user 102 and/or any number of other users to review and/or modify any knowledge dataset stored in the knowledge bank 108 (including the knowledge dataset 180) via the knowledge review window 192.

As shown, in some embodiments, the knowledge capture application 130, the software application 120, and an operating system ("OS") 106, reside in the memory 116 of the compute instance 110 and execute on the processor 112 of the compute instance 110. In some other embodiments, the knowledge capture application 130, the software application 120, and the OS 106 can be distributed across multiple compute instances (e.g., the compute instance 110 and at least one other compute instance). In some embodiments, any number of other software applications execute on the processor 112 during at least a portion of the current computer-based session. Collectively, the software application 120, the OS 106, and any other software programs (e.g., other software applications) executing on the processor 112 during at least a portion of the current computer-based session are also referred to herein as "active software programs."

In some other embodiments, any portion (including all) of the functionality of the knowledge capture application 130 as described herein is incorporated into the software application 120 and/or any number of other software applications. In some such embodiments, the software application 120 can capture and detect deficiencies in knowledge while computer-based tasks are performed via the software application 120 and zero or more other software applications. In the same or other embodiments, because the software application 120 subsumes the functionality of the knowledge capture application 130, the knowledge capture application 130 can be omitted from the system 100.

The software application 120 enables any amount and/or types of computer-based tasks to be performed by the user 102 and zero or more other users. In some embodiments, the current computer-based session depicted in FIG. 1 is distinguished from zero or more other computer-based sessions that are also associated with the computer-based task and zero or more other computer-based sessions that are associated with other computer-based tasks via a session identifier ("ID") 182.

As shown, in some embodiments, the software application 120 displays a task GUI 122 on the display screen 118 during at least a portion of the current computer-based session. In the same or other embodiments, the software application 120 can display any amount and/or types of output data to the user 102 via the task GUI 122 and/or receive any amount and/or types of input data from the user 102 via the task GUI 122. As shown, in some embodiments, the software application 120 generates an artifact 128 during the current computer-based session. In some embodiments, the artifact 128 is associated with a timestamp specifying the point in time during the current computer-based session at which the software application 120 generated the artifact 128.

The artifact 128 can be any type of output of the computer-based task. For instance, in some embodiments, the software application 120 is a computer aided design ("CAD") tool, the computer-based task is to create a three-dimensional ("3D") model of a kitchen appliance, and the artifact 128 is the 3D model of the kitchen appliance. In some other embodiments, the software application 120 is an integrated development environment, the computer-based task is to write source code for a video game, and the artifact 128 is the source code for the video game. In some embodiments, the software application 120 and/or any number of other software applications can each output one or more other artifacts associated with the computer-based task.

In some embodiments, the knowledge capture application 130 generates the categorized knowledge list 188 based, at least in part, a commentary provided by the user 102 while the user 102 performs the computer-based task using the software application 120. In some other embodiments, the user 102 can perform the computer-based task using multiple software applications and the techniques described herein are modified accordingly. As shown, in some embodiments, the knowledge capture application 130 includes, without limitation, a screen capture engine 150, a software context engine 140, a speech engine 160, a prompting engine 170, the knowledge dataset 180, and a knowledge presentation engine 190.

In some embodiments, the screen capture engine 150 automatically records the display screen 118 throughout the current computer-based session to incrementally generate a visual portion of a session recording 184. In some other embodiments, the screen capture engine 150 can be configured to record any amount and/or type of data displayed via the display screen 118 during any number of time intervals in any technically feasible fashion. For instance, in some embodiments, the screen capture engine 150 records the task GUI 122 whenever the user 102 speaks. In some other embodiments, the screen capture engine 150 records the display screen 118 as per recording commands received form the user 102 via a recording window (not shown in FIG. 1). In the same or other embodiments, the prompting engine 170 displays the recording window via the display screen 118. An exemplar recording window is described below in conjunction with FIG. 3A.

The software context engine 140 tracks and timestamps any amount and or types of data associated with any active software programs to incrementally generate software contextual data 186. For instance, in some embodiments, the software context engine 140 tracks and timestamps, without limitation, commands associated with active software programs, which software applications are open, actions performed via active programs, mouse events, keyboard events, one or more cursor positions, one or more scrollbar positions, etc. The software context engine 140 can track each type of software contextual data 186 in any technically feasible fashion.

For instance, in some embodiments, the software context engine 140 uses an accessibility application programming interface associated with the OS 106 to track commands and other metadata associated with each active software program. In the same or other embodiments, the software context engine 140 tracks, via a plugin, when the user 102 clicks on different graphical elements in the task GUI 122. In some embodiments, the software context engine 140 can use the graphical element names to map corresponding command names to more intuitive command names when incrementally generating a command history (not shown) that is included in the software contextual data 186.

In some embodiments, the speech engine 160 automatically records audio input throughout the current computer-based session to incrementally generate an audio portion of the session recording 184. In some other embodiments, the speech engine 160 can be configured to record any amount and/or type of audio input during any number of time intervals in any technically feasible fashion. For instance, in some embodiments, the speech engine 160 records audio input whenever the user 102 speaks. In some other embodiments, the speech engine 160 records audio input as per recording commands received form the user 102 via the recording window.

In some embodiments, as the speech engine 160 receives the audio input, the speech engine 160 automatically transcribes speech included in the audio input to generate a sequence of transcribed utterances (not shown). Each transcribed utterance is a written representation of a different spoken user utterance. For explanatory purposes only, spoken user utterances are also referred to herein individually as "a user utterance 152," and collectively as "user utterances 152." In some embodiments, each user utterance 152 is a continuous portion of speech that begins and ends with a pause.

The speech engine 160 can determine and transcribe the user utterances 152 in any technically feasible fashion. For instance, in some embodiments, the speech engine 160 performs any number and/or types of speech-to-text operations on the user utterances 152 to transcribe the user utterances 152 in real-time. In the same or other embodiments, the speech engine 160 configures a speech-to-text application (not shown) to transcribe the user utterances 152 in real-time. In some embodiments, the speech engine 160 executes one or more speech-to-text algorithms on the user utterances 152 to transcribe the user utterances 152 in real-time.

As shown, in some embodiments, the speech engine 160 generates a different instance of a knowledge item 158 for each of the user utterances 152. For explanatory purposes only, instances of the knowledge item 158 are also referred to herein individually as "the knowledge item 158," and collectively as "the knowledge items 158." Each knowledge item 158 is associated with one of the user utterances 152 and includes, without limitation, the corresponding transcribed utterance and at least one timestamp (e.g., a start timestamp and optionally an end timestamp). In some embodiments, each knowledge item 158 also includes an audio recording of the user utterance 152 associated with the knowledge item 158. In the same or other embodiments, the speech engine 160 determines and attaches zero or more labels to each knowledge item 158 or the corresponding transcribed utterance. For instance, in some embodiments, the speech engine 160 determines and associated (e.g., attaches) zero or more emotion labels (e.g., excitement, frustration, etc.) for each knowledge item 158 based on the affect of the user utterance 152.

In some embodiments, throughout the current computer-based session, the prompting engine 170 prompts the user 102 to verbally describe the computer-based task. As the speech engine 160 generates knowledge items 158 based on the verbal description of the computer-based task, the prompting engine 170 generates the categorized knowledge list 188. As shown, in some embodiments, the prompting engine 170 includes, without limitation, a category specification list 176, the categorized knowledge list 188, and a trigger/action list 172.

The category specification list 176 includes, without limitation, any number of category specifications (not shown). Each category specification is associated with a different category of knowledge items 158, and each knowledge item 158 can belong to zero or more categories. In some embodiments, each category specification includes without limitation, a category name, zero or more indicators for the associated category, and optionally a target capture level or the associated category. In some embodiments, each indicator is a sequence of one or more words (e.g., a word, a phrase, etc.) that is indicative of the associated category. In the same or other embodiments, each target capture level specifies a target number of knowledge items 158 belonging to the associated category to be generated during an evaluation time period (not shown).

The prompting engine 170 can determine the categories, the category specifications, and the category specification list 176 in any technically feasible fashion. For instance, in some embodiments, the prompting engine 170 generates the category specification list 176 based on any number of default category specifications. Subsequently, the prompting engine 170 can modify the category specification list 176 based on any amount and/or types of data. For instance, in some embodiments, the prompting engine 170 computes the target capture level for each category based on an average speech rate associated with the user 102, the category, and the type of the computer-based task.

In some embodiments, the categories include, without limitation, an utterance category, a design intent category, and a process category, a problem category, a to-do item category, and an important element category. In the same or other embodiments, the utterance category, the design intent category, and the process category are associated with target capture levels. The utterance category includes, without limitation, all of the knowledge items 158 that are derived from user utterances 152. The target capture level and the actual capture level associated with the utterance category are also referred to herein as an "overall target capture level" and an "overall actual capture level."

The design intent category is intended to include, without limitation, knowledge items 158 referring to higher-level goals, higher-level intents, and reasons for specific actions. In some embodiments, the indicators for the design intent category include, without limitation, "this is meant to," "because," and "goal."

The process category is intended to include, without limitation, knowledge items 158 referring to steps or operations performed during the computer-based task, tools and commands that are used during the computer-based task, and the environment in which the computer-based task is performed. In some embodiments, the indicators for the process category include, without limitation, "this tool is for" and "this tool is useful for."

The important element category is intended to include, without limitation, knowledge items 158 referring to elements of the artifact 128 or the workflow that are to be flagged for special consideration. In some embodiments, the indicators for the important element category include, without limitation, "it is important."

The problem category is intended to include, without limitation, knowledge items 158 referring to problems associated with software programs, problems associated with approaches, or issues that have not yet been resolved. In some embodiments, the indicators for the problem category include, without limitation, "issue" and "problem."

The to-do item category is intended to include, without limitation, knowledge items 158 referring to steps or subtasks that are to be completed after the current computer-based session. In some embodiments, the indicators for the to-do item category include, without limitation, "I still need to" and "I still have to."

In some embodiments, at the start of the current computer-based session, the prompting engine 170 initializes and displays the prompting widget 138 via the display screen 118. Throughout the current computer-based session, the prompting engine 170 prompts the user 102 to speak about the computer-based task via the prompting widget 138. The prompting engine 170 can configure the prompting widget 138 to prompt the user 102 to speak about the computer-based task in any technically feasible fashion. In some embodiments, for each of the target capture levels, the prompting engine 170 configures the prompting widget 138 to depict an actual capture level with respect to the target capture level. The prompting engine 170 computes each actual capture level based on the categorized knowledge list 188.

At the start of the current computer-based session, the prompting engine 170 initializes the categorized knowledge list 188 to an empty list and each actual capture level to zero. Subsequently, as the speech engine 160 generates each knowledge item 158, the prompting engine 170 classifies the knowledge item 158 into zero or more categories any technically feasible fashion. For instance, in some embodiments, the speech engine 160 performs any number and/or types of classification operations and/or executes any number and/or types of classification algorithms on the knowledge item 158 to determine zero or more of the categories specified via the category specification list 176 to which the knowledge item 158 belongs. The speech engine 160 can perform classification operation(s) and/or execute classification algorithm(s) on the knowledge item 158 based on any amounts (including none) and/or types of relevant data.

For instance, in some embodiments, the prompting engine 170 assigns each knowledge item 158 that is automatically generated by the speech engine 160 to the utterance category. In the same or other embodiments, the prompting engine 170 performs any number and/or types of natural language processing operations and/or executes any number and/or types of natural language processing algorithms on each knowledge item 158 based on the indicators for the categories to categorize the knowledge item 158. In some embodiments, the prompting engine 170 and/or a classification algorithm can take into account the indicators for the categories, labels associated with the knowledge item 158, the software contextual data 186, or any combination thereof when classifying the knowledge item 158. For instance, based on a label of frustration, the prompting engine 170 or a classification algorithm could assign the knowledge item 158 to the problem category.

After categorizing the knowledge item 158, the prompting engine 170 generates a categorized knowledge item (not shown). In some embodiments, each categorized knowledge item specifies, without limitation, a transcribed utterance, zero of more categories to which the knowledge item 158 belongs, and at least one timestamp (e.g., a start time and optionally an end time). The prompting engine 170 then adds the categorized knowledge item to the categorized knowledge list 188.

After adding the categorized knowledge item to the categorized knowledge list 188, the prompting engine 170 computes or updates any actual capture levels that are impacted by the categorized knowledge item. The prompting engine 170 can compute or update a given actual capture level in any technically feasible fashion. For instance, in some embodiments, to compute a given actual capture level, the prompting engine 170 determines a total number of the categorized knowledge items belong to the associated category and are derived from user utterances 152 spoken during the evaluation time period.

The prompting engine 170 can configure the prompting widget 138 to depict each actual capture level with respect to the associated target capture level in any technically feasible fashion. For instance, in some embodiments, the prompting widget 138 includes, without limitation, one or more category wedges, zero or more category buttons, and zero or more detail toggles. Each category wedge corresponds to a category that has an associated target capture level. Each category button corresponds to a category that does not have an associated target capture level. Each detail toggle can expand or collapse associated graphical elements.

As described in greater detail below in conjunction with FIG. 2, in some embodiments, the prompting engine 170 depicts each target capture level as a dashed line across the associated category wedge. In the same or other embodiments, the prompting engine 170 depicts each actual capture level via a fill-level of the associated category wedge. In some embodiments, each category button and each category wedge can be activated based on user input (e.g., a press of the category button or the category wedge).

In some embodiments, in response to a category wedge activation, the prompting engine 170 assigns the categorized knowledge item that was most recently generated to the category represented by the category wedge. The prompting engine 170 also updates the actual capture level associated with the category and updates the category wedge to display the up-to-date actual capture level. In response to a category button activation, the prompting engine 170 assigns the categorized knowledge item that was most recently generated to the category represented by the category wedge.

In some embodiments the trigger/action list 172 includes without limitation, any number and/or types of trigger/action pairs (not shown). Each trigger/action pair specifies an action to be taken upon detecting a trigger. For instance, in some embodiments, one of the trigger action pairs specifies that the categorized knowledge items are to be embedded into the artifact 128 to generate an annotated artifact 198 after the artifact 128 is generated. The prompting engine 170 can detect when the artifact 128 is generated and embed the categorized knowledge items into the artifact 128 in any technically feasible fashion.

For instance, in some embodiments, the prompting engine 170 analyzes commands included in the software contextual data 186 to determine when the artifact 128 is generated. In the same or other embodiments, the prompting engine 170 embeds the categorized knowledge items into the artifact 128 based on the type of the artifact 128. For example, if the artifact 128 is source code, then the prompting engine 170 could embed each categorized knowledge item into the artifact 128 as a separate comment.

In some embodiments, one of the trigger action/pairs specifies that one or more of the graphical elements is to visually prompt for the user utterance 152 that describes knowledge associated with the trigger. For example, the trigger/action pair could specify that when the user 102 sequentially executes three or more undo commands, the category wedge corresponding to the design intent category is to be pulsated.

Advantageously, by displaying the actual capture level with respect to the target capture level for the utterance category, the prompting engine 170 prompts the user 102 to describe the computer-based task throughout the current computer-based session. Further, by displaying the actual capture levels with respect to the corresponding target capture levels for any number of other categories, the prompting engine 170 automatically prompts the user 102 to focus the running commentary on the categories of knowledge for which the actual capture levels are furthest from the corresponding target capture levels. In addition, because the trigger/action pairs more aggressively prompt the user 102 to verbally explain reasons for interesting or anomalous actions, the likelihood that the categorized knowledge list 188 comprehensively covers critical knowledge is increased.

As shown, in some embodiments, the prompting engine 170 incrementally generates the knowledge dataset 180 that includes, without limitation, the session ID 182, the session recording 184, the software contextual data 186, and the categorized knowledge list 188. In some other embodiments, the knowledge dataset 180 can include, without limitation, the categorized knowledge list 188 and any amount and/or types of data that are relevant to the knowledge captured via the categorized knowledge items included in the categorized knowledge list 188.

After the current computer-based session is complete, the prompting engine 170 stops displaying the prompting widget 138 and stores the knowledge dataset 180 in the knowledge bank 108. In some embodiments, the knowledge bank 108 can includes, without limitation, any amount and/or types of memory that are accessible to the user 102 and at least one other user. The knowledge bank 108 can also store any number of other knowledge datasets associated with other computer-based sessions.

As depicted via dashed lines and dashed boxes, in some embodiments, the knowledge presentation engine 190 enables the user 102 to access the knowledge dataset 180 during the current computer-based session via the knowledge review window 192 that the knowledge presentation engine 190 displays on the display screen 118. In the same or other embodiments, the knowledge presentation engine 190 allows the user 102 to view the session recording 184, view any amount and/or types of the software contextual data 186, view and edit the categorized knowledge list 188 and the categorized knowledge items, and provide textual and/or verbal input for new categorized knowledge items.

In some embodiments, during the current computer-based session, the knowledge presentation engine enables the user 102 to access other knowledge datasets stored in the knowledge bank 108 via the knowledge review window 192. In the same or other embodiments, after the current computer-based session is complete, the knowledge presentation engine enables the user 102 and any number of other users to access (e.g., retrospectively review and optionally retrospectively modify) any knowledge dataset (including the knowledge dataset 180) stored in the knowledge bank 108 via any number of knowledge review windows 192.

Note that the techniques described herein are illustrative rather than restrictive and can be altered without departing from the broader spirit and scope of the invention. Many modifications and variations on the functionality provided by the software application 120, the knowledge capture application 130, the software context engine 140, the screen capture engine 150, the speech engine 160, the prompting engine 170, and the knowledge presentation engine 190 will be apparent to those of ordinary skill in the art without departing from the scope and spirit of the described embodiments. For instance, in some embodiments, after the current computer-based session is complete, the prompting engine 170 modifies one or more outputs of the current computer-based task (e.g., the artifact 128) based on the knowledge dataset 180 to generate one or more annotated outputs (e.g., the annotated artifact 198).

It will be appreciated that the system 100 shown herein is illustrative and that variations and modifications are possible. For example, the functionality provided by the software application 120, the knowledge capture application 130, the software context engine 140, the screen capture engine 150, the speech engine 160, the prompting engine 170, and the knowledge presentation engine 190 as described herein can be integrated into or distributed across any number of software applications (including one), and any number of components of the system 100. Further, the connection topology between the various units in FIG. 1 can be modified as desired.

Figure 2:
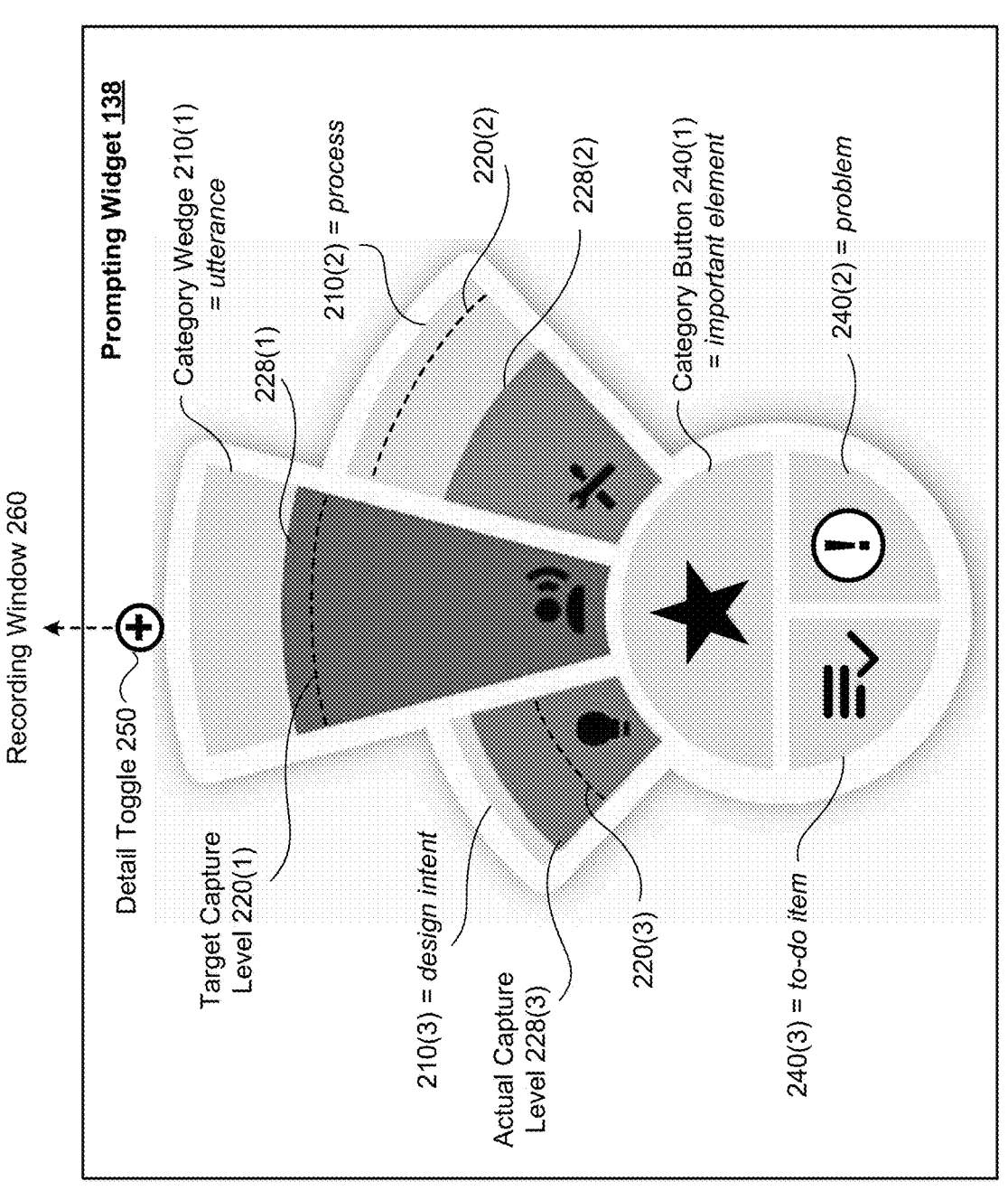
FIG. 2 is an exemplar illustration of the prompting widget of FIG. 1, according to various embodiments.

FIG. 2 is an exemplar illustration of the prompting widget 138 of FIG. 1, according to various embodiments. As shown, in some embodiments, the prompting widget 138 includes, without limitation, a category wedge 210(1) a category wedge 210(2), a category wedge 210(3), a category button 240(1), a category button 240(2), a category button 240(3), and a detail toggle 250.

The category wedges 210(1)-210(3) correspond to a utterance category, a process category, and a design intent category, respectively. As described previously herein in conjunction with FIG. 1, all knowledge items derived from user utterances 152 belong to the utterance category. Further, and for explanatory purposes only, the subset of the knowledge items belonging to the process category is larger than the subset of the knowledge items belong to the design intent category, Accordingly, the category wedge 210(1) is larger than the category wedge 210(2), and the category wedge 210(2) is larger than the category wedge 210(3).

The category wedge 210(1) is annotated with a speaking symbol and a dashed line representing a target capture level 220(1). An actual capture level 228(1) corresponds to a fill-level at the top of a darkly shaded portion of the category wedge 210(1). As shown, the actual capture level 228(1) is higher than the target capture level 220(1). The detail toggle 250 is located proximate to the category wedge 210(1) and expands and contracts a recording window 260. An example of the recording window 260 is described in greater detail below in conjunction with FIG. 3A.

The category wedge 210(2) is annotated with a tools symbol and a dashed line representing a target capture level 220(2). An actual capture level 228(2) corresponds to a fill-level at the top of a darkly shaded portion of the category wedge 210(2). As shown, the actual capture level 228(2) is lower than the target capture level 220(2).

The category wedge 210(3) is annotated with a light bulb symbol and a dashed line representing a target capture level 220(3). An actual capture level 228(3) corresponds to a fill-level at the top of a darkly shaded portion of the category wedge 210(3). As shown, the actual capture level 228(3) is higher than the target capture level 220(3).

At the point in time depicted in FIG. 2, the actual capture level 228(2) is lower than the target capture level 220(1), while the actual capture levels 228(1) and 228(3) are higher than the target capture levels 220(1) and 220(3), respectively. Accordingly, at the point in time depicted FIG. 2, the prompting widget 138 automatically encourages the user 102 to verbally describe the procedures associated with the computer-based task.

As shown, the category button 240(1) corresponds to the important element category and is annotated with a star symbol. The category button 240(2) corresponds to the problem category and is annotated with an exclamation point symbol. The category button 240(3) corresponds to the to-do item category and is annotated with a list/checkmark symbol.

FIG. 3A is an exemplar illustration of the recording window 260 of FIG. 2, according to various embodiments. As shown, in some embodiments, the recording window 260 includes, without limitation, a stop recording button, a currently recording progress slider, and a transcription field that displays each transcribed utterance as the speech engine 160 generates the transcribed utterance. Although not show, if the stop recording button is activated, then the recording window 260 replaces the stop recording button with a start recording button. In some other embodiments, the recording window 260 can include, without limitation, any number and/or types of recording controls. In some embodiments, the recording window 260 provides any number and/or type of editing tools that enable the user 102 to edit each transcribed utterance in real-time.

FIG. 3B is an exemplar illustration of the knowledge review window 192 of FIG. 1, according to various embodiments. As shown, in some embodiments, the knowledge review window 192 includes, without limitation, a retrospective entry box 310, a knowledge item browser 320, a playback window 330, and a command history pane 340.

The retrospective entry box 310 allows the user 102 to retrospectively enter written comments. In some embodiments, the prompting engine 170 generate a new categorized knowledge item for each written comment that is entered via the knowledge review window 192.

The knowledge item browser 320 allows the user 102 to retrospectively browse and edit the categorized knowledge items are included in the categorized knowledge list 188 at a current point in time. The knowledge item browser 320 can implement, without limitation, any number and/or types of graphical elements and/or GUI techniques to enable the user 102 to effectively edit and review the categorized knowledge items. As shown, in some embodiments, the user 102 can edit the categories to which each of the categorized knowledge items is assigned by clicking on symbols representing the categories.

The playback window 330 allows the user 102 to playback the session recording 184. The playback window 330 can implement, without limitation, any number and/or types of playback controls in any technically feasible fashion.

The command history pane 340 allows the user 102 to browse through a command history that is included in the software contextual data 186. Notably, in some embodiments, as the user 102 changes the time period represented via any of the retrospective entry box 310, the knowledge item browser 320, the playback window 330, or the command history pane 340, the knowledge presentation engine 190 automatically updates the other graphical elements included in the knowledge review window 192 to represent the same time period.

Figure 4B:
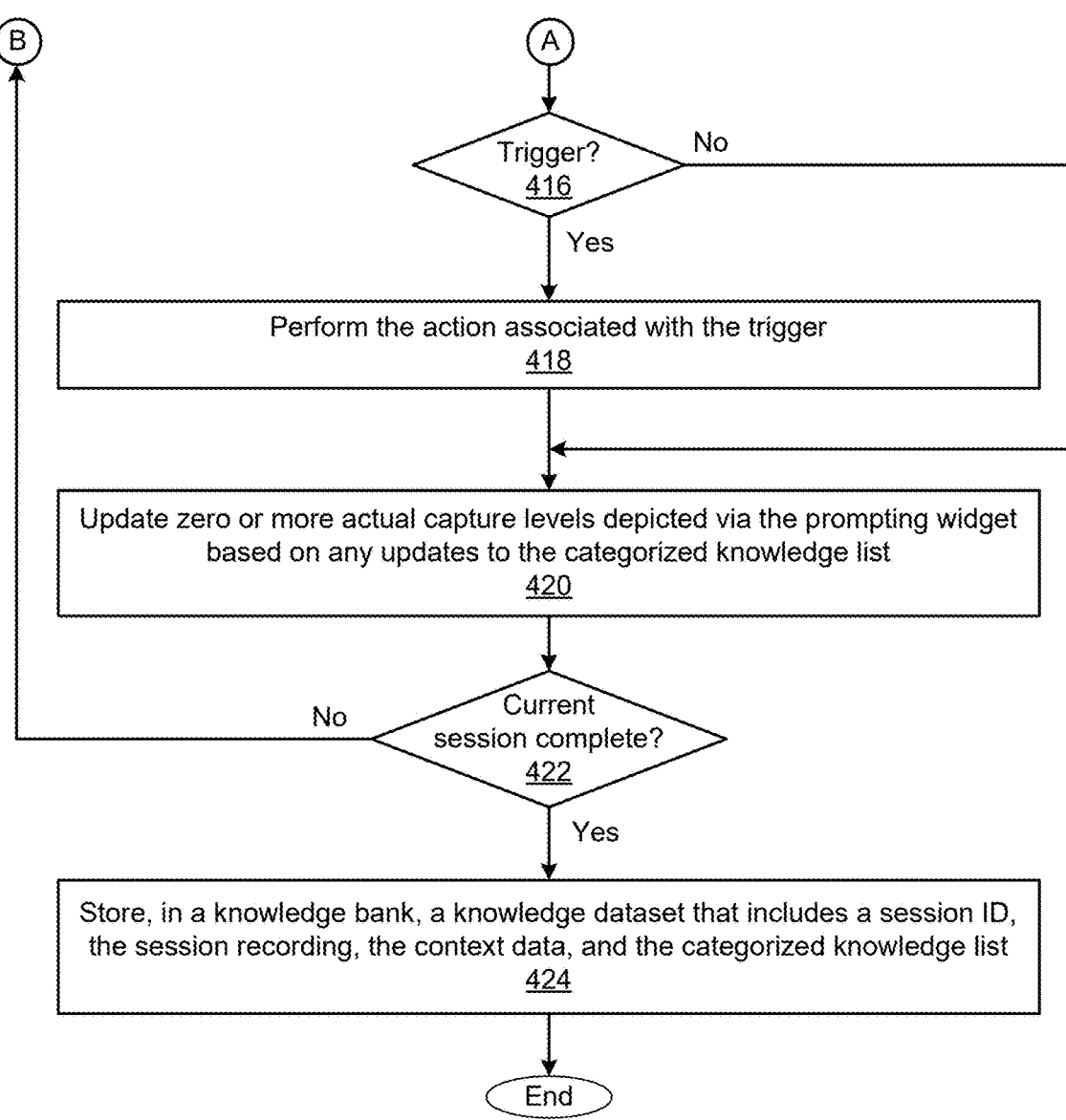

FIGS. 4A-4B set forth a flow diagram of method steps for automatically capturing the knowledge associated with a computer-based task, according to various embodiments. Although the method steps are described with reference to the systems of FIGS. 1-3B, persons skilled in the art will understand that any system configured to implement the method steps, in any order, falls within the scope of the present invention.

As shown, a method 400 begins at step 402, where the prompting engine 170 initializes the categorized knowledge list 188 and displays, via the display screen 118, the prompting widget 138 associated with the categorized knowledge list 188. At step 404, the screen capture engine 150 begins recording the display screen 118 to incrementally generate a video portion of the session recording 184. At step 406, the software context engine 140 begins capturing software contextual data 186. At step 408, the speech engine 160 begins recording speech to incrementally generate an audio portion of the session recording 184 and transcribing the user utterances 152 included in the recorded speech to sequentially generate knowledge items 158.

At step 410, the prompting engine 170 analyzes software contextual data 186 until detecting a trigger of a trigger/action pair or acquiring a new one of the knowledge items 158. At step 412, the prompting engine 170 determine whether the prompting engine 170 has detected a new one of the knowledge item 158. If, at step 412, the prompting engine 170 determines that the prompting engine 170 has not detected a new one of the knowledge item 158, then the method 400 proceeds directly to step 416.

If, however, at step 412, the prompting engine 170 determines that the prompting engine 170 has detected a new one of the knowledge items 158, then the method 400 proceeds to step 414. At step 414, the prompting engine 170 performs one or more classification operations on the knowledge item 158 to generate a categorized knowledge item and then adds the categorized knowledge item to the categorized knowledge list 188.

At step 416, the prompting engine 170 determines whether the prompting engine 170 has detected a trigger. If, at step 416, the prompting engine 170 determines that the prompting engine 170 has not detected a trigger, then the method 400 proceeds directly to step 420.

If, however, at step 416, the prompting engine 170 determines that the prompting engine 170 has detected a trigger, then the method 400 proceeds to step 418. At step 418, the prompting engine 170 performs the action associated with the trigger.

At step 420, the prompting engine 170 updates zero or more actual capture levels 228 depicted via the prompting widget 138 based on any updates to the categorized knowledge list 188. At step 422, the prompting engine 170 determines whether the current computer-based session is complete. If, at step 422, the prompting engine 170 determines that the current computer-based session is not complete, then the method 400 returns to step 410, where the prompting engine 170 continues to analyze the software contextual data 186 until detecting a trigger of a trigger/action pair or acquiring a new one of the knowledge items 158.

If, however, at step 422, the prompting engine 170 determines that the current computer-based session is complete, then the method 400 proceeds to step 424. At step 424, the knowledge capture application 130 stores the knowledge dataset 180 in the knowledge bank 108 that is accessible to any number and/or types of software applications. The knowledge dataset 180 includes, without limitation, the session ID 182 for the current computer-based session, the session recording 184, the software contextual data 186, and the categorized knowledge list 188. The method 400 then terminates. As described previously herein, in some embodiments, the knowledge presentation engine 190 enables any number of users to access any number of knowledge datasets (including the knowledge dataset 180) that are stored in the knowledge bank 108 via any number of knowledge review windows 192.

In sum, the disclosed techniques can be used to automatically capture knowledge associated with computer-based tasks based on concurrent verbal commentaries. In some embodiments, a knowledge capture application generates a knowledge dataset while a computer-based task is performed via a software application. The knowledge capture application includes, without limitation, a speech engine, a screen capture engine, a software context engine, a prompting engine, and a knowledge presentation engine.

The speech engine records audio input to incrementally generate an audio portion of a session recording and transcribes speech included in the recorded audio to sequentially generate knowledge items. Each knowledge item includes, without limitation, a transcribed utterance and is associated with at least one timestamp (e.g., a start time and optionally an end time). The screen capture engine records a display screen to incrementally generate a video portion of a session recording. The software context engine captures and timestamps any amount and/or types of software contextual data.

The prompting engine initializes and displays a prompting widget via the display screen. The prompting widget includes, without limitation, category buttons, category wedges, and zero or more detail toggles that can expand or collapse associated graphical elements. Each category button and each category wedges enables the user to assign user utterances (and the associated knowledge items) to a corresponding category in real-time. In addition, each category wedge depicts an actual capture level for the corresponding category with respect to a target capture level for the corresponding category.

As the speech engine generates each knowledge item, the prompting engine performs one or more classification operation on the knowledge item to generate a categorized knowledge item and then adds the categorized knowledge item to a categorized knowledge list. The categorized knowledge item specifies, without limitation, the knowledge item and zero or more categories to which the knowledge item belongs. The prompting engine can subsequently update the categorized knowledge item based on user input (e.g., a click of a category button). Whenever the prompting engine generates or updates a categorized knowledge item, the prompting engine updates any impacted actual capture levels and the associated knowledge wedges.

During the current computer-based session, the prompting engine incrementally generates a knowledge dataset that includes, without limitation, a session ID, the session recording, the software contextual data, and the categorized knowledge list. The prompting engine also analyzes the software contextual data in real time to detect triggers of trigger/action pairs. Upon detecting a trigger, the prompting engine executes the associated action(s). After the current computer-based session is complete, the prompting engine stores the knowledge dataset in a knowledge bank that is accessible to any number of users.

During the current computer-based session, the knowledge presentation engine enables the user to review any of the knowledge datasets stored in the knowledge bank and the knowledge dataset associated with the current computer-based session. More precisely, for a given knowledge dataset, the knowledge presentation engine allows users to view the session recording, view any amount and/or types of the software contextual data, view and edit the categorized knowledge list and the categorized knowledge items, and provide textual input for new categorized knowledge items. After the current computer-based session is complete, the knowledge presentation engine enables any number of users to review any of the knowledge datasets (including the knowledge dataset for the current computer-based session) that are stored in the knowledge bank.

At least one technical advantage of the disclosed techniques relative to the prior art is that the disclosed techniques can be incorporated into a software application to enable the software application to automatically capture and detect shortcomings in the knowledge associated with computer-based tasks, while those tasks are being performed via the software application and/or different software application(s). In particular, with the disclosed techniques, the software application can visually prompt a user to increase the depth and/or scope of a running commentary associated with a computer-based task when the actual capture levels for one or more knowledge categories are lower than corresponding target capture levels for those categories. This functionality, which is not available in conventional software applications, can increase both the comprehensiveness and the overall quality of the knowledge captured by the software application. These technical advantages provide one or more technological improvements over prior art approaches.

1. In some embodiments, a computer-implemented method for automatically capturing knowledge associated with computer-based tasks comprises during a computer-based session during which a computer-based task is being performed, performing one or more operations on a first user utterance to automatically generate a first knowledge item; performing one or more classification operations on the first knowledge item to generate a first categorized knowledge item that associates the first knowledge item with a first category; modifying a first element included in a graphical user interface to visually indicate an actual capture level associated with the first category; and generating a knowledge dataset based on the first categorized knowledge item for storage or display.

2. The computer-implemented method of clause 1, wherein performing the one or more operations on the first user utterance comprises executing a speech-to-text algorithm on the first user utterance to generate a transcribed utterance.

3. The computer-implemented method of clauses 1 or 2, wherein the first category comprises one of an utterance category, a design intent category, a process category, a problem category, a to-do item category, or an important element category.

4. The computer-implemented method of any of clauses 1-3, wherein the first element depicts a target capture level associated with the first category.

5. The computer-implemented method of any of clauses 1-4, wherein modifying the first element comprises updating a fill-level that is visually depicted via the first element to reflect the actual capture level instead of a previous capture level.

6. The computer-implemented method of any of clauses 1-5, wherein performing the one or more classification operations on the first knowledge item comprises executing a natural language processing algorithm on the first knowledge item based on a sequence of one or more words that is indicative of the first category.

7. The computer-implemented method of any of clauses 1-6, further comprising based on the first knowledge item, modifying a third element included in the graphical user interface to visually indicate a first overall actual capture level associated with the computer-based session; performing one or more operations on a second user utterance to automatically generate a second knowledge item; generating a second categorized knowledge item that associates the second knowledge item with a second category based on user input received via a second element included in the graphical user interface; and based on the second knowledge item, modifying the third element to visually indicate a second overall actual capture level associated with the computer-based session instead of the first overall actual capture level.

8. The computer-implemented method of any of clauses 1-7, further comprising modifying an output of the computer-based task based on the knowledge dataset to generate an annotated output that includes a description of at least a portion of the knowledge dataset.

9. The computer-implemented method of any of clauses 1-8, wherein generating the knowledge dataset comprises aggregating the first categorized knowledge item with at least a second categorized knowledge item to generate a categorized knowledge list; and aggregating the categorized knowledge list with at least one of a screen recording associated with the computer-based session, an audio recording that is associated with the computer-based session and includes the first user utterance, or software contextual data associated with the computer-based session to generate the knowledge dataset that is subsequently used to retrospectively review the computer-based session.

10. The computer-implemented method of any of clauses 1-9, further comprising tracking at least one of commands associated with a software application, actions performed via a software application, events associated with a mouse, events associated with a keyboard, a cursor position, or a scrollbar position to generate the software contextual data.

11. In some embodiments, one or more non-transitory computer readable media include instructions that, when executed by one or more processors, cause the one or more processors to automatically capture knowledge associated with computer-based tasks by performing the steps of during a computer-based session during which a computer-based task is being performed, performing one or more operations on a first user utterance to automatically generate a first knowledge item; performing one or more classification operations on the first knowledge item to generate a first categorized knowledge item that associates the first knowledge item with a first category; modifying a first element included in a graphical user interface to visually indicate an actual capture level associated with the first category; and generating a knowledge dataset based on the first categorized knowledge item for storage or display.

12. The one or more non-transitory computer readable media of clause 11, wherein performing the one or more operations on the first user utterance comprises transcribing the first user utterance to generate a first transcribed utterance; determining a first emotion label based on the first user utterance; and associating the first emotion label with the first transcribed utterance.

13. The one or more non-transitory computer readable media of clauses 11 or 12, wherein the first category comprises one of an utterance category, a design intent category, a process category, a problem category, a to-do item category, or an important element category.

14. The one or more non-transitory computer readable media of any of clauses 11-13, wherein the first element depicts a target capture level associated with the first category.

15. The one or more non-transitory computer readable media of any of clauses 11-14, wherein modifying the first element comprises updating a fill-level that is visually depicted via the first element to reflect the actual capture level instead of a previous capture level.

16. The one or more non-transitory computer readable media of any of clauses 11-15, wherein performing the one or more classification operations on the first knowledge item comprises executing a classification algorithm on the first knowledge item based on at least one of a sequence of one or more words that is indicative of the first category, an emotion label associated with the first knowledge item, or software contextual data associated with the computer-based task.

17. The one or more non-transitory computer readable media of any of clauses 11-16, further comprising modifying a second element included in the graphical user interface to visually indicate an overall capture level associated with the computer-based session.

18. The one or more non-transitory computer readable media of any of clauses 11-17, wherein generating the knowledge dataset comprises aggregating the first categorized knowledge item with at least a second categorized knowledge item to generate a categorized knowledge list; and aggregating the categorized knowledge list with at least one of a screen recording associated with the computer-based session, an audio recording that is associated with the computer-based session and includes the first user utterance, or software contextual data associated with the computer-based session to generate the knowledge dataset that is subsequently used to retrospectively review the computer-based session.

19. The one or more non-transitory computer readable media of any of clauses 11-18, further comprising detecting a trigger based on at least one of the first user utterance or software contextual data associated with the computer-based session and in response, modifying the first element to visually prompt for a second user utterance that describes knowledge associated with the trigger.

20. In some embodiments, a system comprises one or more memories storing instructions and one or more processors coupled to the one or more memories that, when executing the instructions, perform the steps of during a computer-based session during which a computer-based task is being performed, performing one or more operations on a first user utterance to automatically generate a first knowledge item; performing one or more classification operations on the first knowledge item to generate a first categorized knowledge item that associates the first knowledge item with a first category; modifying a first element included in a graphical user interface to visually indicate an actual capture level associated with the first category; and generating a knowledge dataset based on the first categorized knowledge item for storage or display.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. Aspects of the present embodiments can be embodied as a system, method, or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable media having computer readable program codec embodied thereon.

Any combination of one or more computer readable media can be utilized. Each computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for automatically capturing knowledge associated with computer-based tasks, the method comprising:

during a computer-based session during which a computer-based task is being performed, performing one or more operations on a first user utterance to automatically generate a first knowledge item;

performing one or more classification operations on the first knowledge item to generate a first categorized knowledge item that associates the first knowledge item with a first category;

modifying a first element included in a graphical user interface to visually indicate an actual capture level associated with the first category by updating a fill-level that graphically represents the actual capture level, wherein the first element further includes a target line that graphically represents a target capture level associated with the first category; and generating a knowledge dataset based on the first categorized knowledge item for storage or display.

2. The computer-implemented method of claim 1, wherein performing the one or more operations on the first user utterance comprises executing a speech-to-text algorithm on the first user utterance to generate a transcribed utterance.

3. The computer-implemented method of claim 1, wherein the first category comprises one of an utterance category, a design intent category, a process category, a problem category, a to-do item category, or an important element category.

4. The computer-implemented method of claim 1, wherein the first element reflects the actual capture level instead of a previous capture level.

5. The computer-implemented method of claim 1, wherein performing the one or more classification operations on the first knowledge item comprises executing a natural language processing algorithm on the first knowledge item based on a sequence of one or more words that is indicative of the first category.

6. The computer-implemented method of claim 1, further comprising:

based on the first knowledge item, modifying a third element included in the graphical user interface to visually indicate a first overall actual capture level associated with the computer-based session;

performing one or more operations on a second user utterance to automatically generate a second knowledge item;

generating a second categorized knowledge item that associates the second knowledge item with a second category based on user input received via a second element included in the graphical user interface; and based on the second knowledge item, modifying the third element to visually indicate a second overall actual capture level associated with the computer-based session instead of the first overall actual capture level.

7. The computer-implemented method of claim 1, further comprising modifying an output of the computer-based task based on the knowledge dataset to generate an annotated output that includes a description of at least a portion of the knowledge dataset.

8. The computer-implemented method of claim 1, wherein generating the knowledge dataset comprises:

aggregating the first categorized knowledge item with at least a second categorized knowledge item to generate a categorized knowledge list; and aggregating the categorized knowledge list with at least one of a screen recording associated with the computer-based session, an audio recording that is associated with the computer-based session and includes the first user utterance, or software contextual data associated with the computer-based session to generate the knowledge dataset that is subsequently used to retrospectively review the computer-based session.

9. The computer-implemented method of claim 8, further comprising tracking at least one of commands associated with a software application, actions performed via a software application, events associated with a mouse, events associated with a keyboard, a cursor position, or a scrollbar position to generate the software contextual data.

10. The computer-implemented method of claim 1, wherein the first element comprises a first wedge associated with the first category, and the first wedge includes a shaded portion, wherein a top of the shaded portion corresponds to the fill-level that graphically represents the actual capture level.

11. One or more non-transitory computer readable media including instructions that, when executed by one or more processors, cause the one or more processors to automatically capture knowledge associated with computer-based tasks by performing the steps of:

during a computer-based session during which a computer-based task is being performed, performing one or more operations on a first user utterance to automatically generate a first knowledge item;

performing one or more classification operations on the first knowledge item to generate a first categorized knowledge item that associates the first knowledge item with a first category;

modifying a first element included in a graphical user interface to visually indicate an actual capture level associated with the first category by updating a fill-level that graphically represents the actual capture level, wherein the first element further includes a target line that graphically represents a target capture level associated with the first category; and generating a knowledge dataset based on the first categorized knowledge item for storage or display.

12. The one or more non-transitory computer readable media of claim 11, wherein performing the one or more operations on the first user utterance comprises:

transcribing the first user utterance to generate a first transcribed utterance;

determining a first emotion label based on the first user utterance; and associating the first emotion label with the first transcribed utterance.

13. The one or more non-transitory computer readable media of claim 11, wherein the first category comprises one of an utterance category, a design intent category, a process category, a problem category, a to-do item category, or an important element category.

14. The one or more non-transitory computer readable media of claim 11, wherein the first element reflects the actual capture level instead of a previous capture level.

15. The one or more non-transitory computer readable media of claim 11, wherein performing the one or more classification operations on the first knowledge item comprises executing a classification algorithm on the first knowledge item based on at least one of a sequence of one or more words that is indicative of the first category, an emotion label associated with the first knowledge item, or software contextual data associated with the computer-based task.

16. The one or more non-transitory computer readable media of claim 11, further comprising modifying a second element included in the graphical user interface to visually indicate an overall capture level associated with the computer-based session.

17. The one or more non-transitory computer readable media of claim 11, wherein generating the knowledge dataset comprises:

aggregating the first categorized knowledge item with at least a second categorized knowledge item to generate a categorized knowledge list; and aggregating the categorized knowledge list with at least one of a screen recording associated with the computer-based session, an audio recording that is associated with the computer-based session and includes the first user utterance, or software contextual data associated with the computer-based session to generate the knowledge dataset that is subsequently used to retrospectively review the computer-based session.

18. The one or more non-transitory computer readable media of claim 11, further comprising:

detecting a trigger based on at least one of the first user utterance or software contextual data associated with the computer-based session; and in response, modifying the first element to visually prompt for a second user utterance that describes knowledge associated with the trigger.

19. A system comprising:

one or more memories storing instructions; and one or more processors coupled to the one or more memories that, when executing the instructions, perform the steps of:

during a computer-based session during which a computer-based task is being performed, performing one or more operations on a first user utterance to automatically generate a first knowledge item;

performing one or more classification operations on the first knowledge item to generate a first categorized knowledge item that associates the first knowledge item with a first category;

modifying a first element included in a graphical user interface to visually indicate an actual capture level associated with the first category by updating a fill-level that graphically represents the actual capture level, wherein the first element further includes a target line that graphically represents a target capture level associated with the first category; and generating a knowledge dataset based on the first categorized knowledge item for storage or display.

* * * * *